US009087637B2

(12) United States Patent
Jenwatanavet et al.

(10) Patent No.: US 9,087,637 B2
(45) Date of Patent: Jul. 21, 2015

(54) UNIVERSAL APPARATUS FOR WIRELESS DEVICE CHARGING USING RADIO FREQUENCY (RF) ENERGY

(75) Inventors: Jatupum Jenwatanavet, San Diego, CA (US); Zhen Ning Low, San Diego, CA (US); Ernest T. Ozaki, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 13/561,071

(22) Filed: Jul. 29, 2012

(65) Prior Publication Data

US 2014/0028251 A1 Jan. 30, 2014

(51) Int. Cl.
*H02J 7/00* (2006.01)
*H01F 27/36* (2006.01)
*H01F 38/14* (2006.01)

(52) U.S. Cl.
CPC ................ *H01F 27/36* (2013.01); *H01F 38/14* (2013.01)

(58) Field of Classification Search
USPC .......................................................... 320/108
See application file for complete search history.

(56) References Cited

U.S. PATENT DOCUMENTS 6,603,382 B1 8/2003 Komai et al.
7,872,445 B2 1/2011 Hui
7,936,147 B2 5/2011 Kook
8,749,334 B2 6/2014 Boys et al.
2007/0064406 A1 3/2007 Beart
2009/0267559 A1* 10/2009 Toya et al. .................... 320/108
2010/0081483 A1 4/2010 Chatterjee et al.
2011/0086256 A1 4/2011 Julstrom et al.
2011/0140653 A1 6/2011 Jung et al.
2011/0234155 A1 9/2011 Chen et al.
2012/0235636 A1* 9/2012 Partovi .......................... 320/108

FOREIGN PATENT DOCUMENTS

CN 201893621 U 7/2011
EP 2172952 A1 4/2010
GB 2389720 A 12/2003
JP 2011182593 A 9/2011

OTHER PUBLICATIONS

International Search Report and Written Opinion—PCT/US2013/052367—ISA/EPO—Nov. 7, 2013.

* cited by examiner

*Primary Examiner* — Paul Dinh
*Assistant Examiner* — Bryce Aisaka

(57) ABSTRACT

An apparatus for wireless charging using radio frequency (RF) energy includes a charger coil configured to produce RF charging energy as a magnetic field, the charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger coil and a second portion of magnetic material overlying the charger coil.

43 Claims, 10 Drawing Sheets

UNIVERSAL APPARATUS FOR WIRELESS DEVICE CHARGING USING RADIO FREQUENCY (RF) ENERGY

DESCRIPTION OF THE RELATED ART

Portable communication devices, such as cellular telephones, are frequently used with wireless headsets, and other small form factor devices. Further, it is envisioned that there are applications for portable communication devices that will distribute the functionality of a portable cellular telephone over smaller devices. One such application is the use of a small, wrist-worn device that can be paired with a wireless headset or earpiece to function as a portable cellular telephone. Other device functionality, such as GPS-based location and navigation, and other functionality can also be incorporated into the wrist-worn device. A common requirement for each of these devices is that they are typically powered by a small, rechargeable power source, such as a rechargeable battery. Under normal operating conditions, the rechargeable battery must be frequently recharged. One manner of recharging the battery is to use a wired charger that requires a household alternating-current (AC) source to supply the charging energy directly to the device. One problem with a wired charging arrangement is that the device to be charged must include a connector port to which a corresponding connector on the charger is connected. Such connectors require physical space, and make it difficult to seal the enclosure of the device to provide a watertight or water resistant package.

It would be desirable for charging to occur without the need for a wired connection. Further, wireless charging allows a device to be manufactured without an external charging connection, which facilitates the fabrication of a watertight or water resistant package. Wireless charging also provides freedom of movement for the user and allows multiple devices to be charged simultaneously. Examples of devices that may benefit from a wireless charging connection include, but are not limited to, a wireless headset, a multiple-function wristwatch, a wrist-worn display or other wrist-worn device, a hearing aid, an electronic earpiece, or other devices.

One type of apparatus for wirelessly charging a device using radio frequency (RF) energy generally includes a power source and one or more RF coils or other structures for transferring power to the device to be charged without a wired connection. A device to be wirelessly charged generally includes an antenna adapted to receive the RF charging power.

An RF wireless charger is typically sensitive to the material of the surface on which the wireless charger is located. For example, a metal or metallic surface can impede the transfer of charging energy from the wireless charger to the device to be charged, and in some cases, damage the wireless charger or otherwise render it inoperative.

Typically, a wireless charger is designed and tuned, or optimized, for only one kind of surface and the performance of the wireless charger when located on or near a different surface is not controllable. Moreover, as a wireless charger operates by using RF energy, the wireless charger could cause electromagnetic interference to other devices located in the vicinity of the wireless charger.

Therefore, it is desirable to have a wireless charger that can operate on or near any surface, and that does not unduly emit RF interference or noise.

SUMMARY

An embodiment of an apparatus for wireless charging using radio frequency (RF) energy includes a charger coil configured to produce RF charging energy as a magnetic field, the charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger coil and a second portion of magnetic material overlying the charger coil.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The universal apparatus for wireless device charging using RF energy can be incorporated into what is referred to as a “personal communications hub.” A personal communications hub can include a communication device, a personal digital assistant, or another personal electronic communication device along with a wireless headset, earpiece, or other device. As an example, a personal communications hub may include a wrist-worn device that functions as a communication device and/or a display device and a wireless earpiece or headset that is wirelessly coupled to the wrist-worn device. The wireless earpiece or headset is used for audible communication. These devices are powered by rechargeable power sources, which are charged by a charging system or charging station. The charging system is also referred to as a wireless power transmitter.

Figure 1:
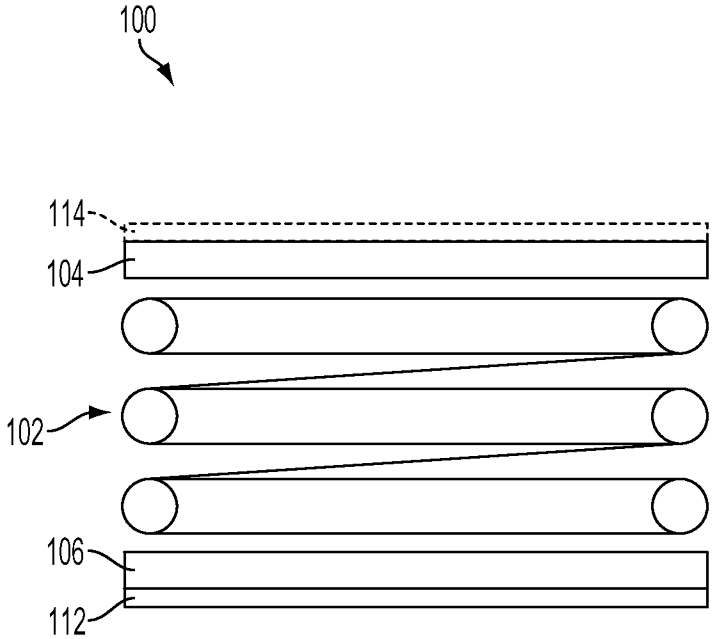
FIG. 1 is a schematic diagram showing a portion of a wireless charger having an RF charger coil.

FIG. 1 is a schematic diagram showing a portion 100 of a wireless charger having an RF charger coil 102. The diagram of FIGS. 1, 2 and 3A-3D are schematic in nature in that they do not show a housing, enclosure or structure to contain and support the elements. Neither do FIGS. 1, 2 and 3A-3D show a power supply or a structure configured to generate charging energy. Those having ordinary skill in the art will understand that the elements shown in FIGS. 1, 2 and 3A-3D are typically incorporated in a housing, enclosure or structure, including wiring, circuitry, and other elements and features to form a universal apparatus for wireless charging using RF energy. Further, while illustrated as a cylindrically wound coil, the RF charger coil may be made of any conductive material, such as copper wire, and may take other shapes and form factors, such as, but not limited to, a multiple-turn conductive coil formed into a cylindrical shape or formed into a planar shape or may be implemented as a printed structure, such as a printed coil formed from a flexible film.

The RF charger coil 102 is located between layers of magnetic material 104 and 106. As used herein, the term “layer” refers to a planar layer or sheet of material having a thickness substantially less than its length and width. The thickness of each described layer of magnetic material and metal material is determined by the electrical design and the overall dimensions of a wireless charger within which the described structure is implemented. Further, the thickness of each described layer of magnetic material and metal material may differ, depending on its location. An example thickness of the magnetic material 104 and 106 (and the magnetic material described elsewhere herein) is approximately 0.375 mm and can be obtained from Panasonic Corporation using part number KNZFACA37QLO. However, other thicknesses and magnetic materials are possible, depending on the design of the wireless charger. The magnetic material 106 preferably extends completely over the bottom of the area occupied by the RF charger coil 102. The magnetic material 104 need not extend completely over the top of the area occupied by the RF charger coil 102, but instead can extend over the periphery of the RF charger coil 102. A layer of metal material 112 underlays the magnetic material 106, and an optional layer of metal material 114 at least partially overlays the magnetic material 104. The magnetic material 106, 104 need not be in direct contact with the metal material 112 or the optional metal material 114, but having the magnetic material 106, 104 in direct contact with the respective metal material 112, 114, minimizes the overall size of a wireless charging device incorporating the charger portion 100. Similarly, the magnetic material 106, 104 need not be in direct contact with the RF charger coil 102, but having the magnetic material 106, 104 in direct contact with the RF charger coil 102 minimizes the overall size of a device incorporating the charger portion 100.

The magnetic material 106 confines the magnetic field generated by the RF charger coil 102, and the metal material 112 isolates the RF charger coil 102 from external effects caused by locating the RF charger coil 102 on a surface other than the surface used when the RF charger coil 102 was initially tuned. Stated another way, the combination of the magnetic material 106 and the metal material 112 makes the magnetic field generated by the RF charger coil 102 consistent and relatively immune to external effects that may be caused by moving the RF charger coil 102 from surface to surface. The combination of the magnetic material 106 and the metal material 112 also helps to reduce the sensitivity of the RF charger coil 102 to objects located alongside or adjacent the RF charger coil 102.

The combination of the magnetic material 106 and the metal material 112 allows a universal wireless charger having such an RF charger coil 102 to operate on any surface. The magnetic material 104, and optionally, the metal material 114, and, to a lesser degree, the magnetic material 106 and the metal material 112, reduce or eliminate any electromagnetic interference emanating from the wireless charger, as well as reduces or eliminates the energy coupling from the wireless charger to a near field communication (NFC) device located near the RF coil 102.

The magnetic material 106 and the metal material 112 allows a charger apparatus having the RF charger coil to be detuned by placing the metal material 112 proximate to the RF charger coil 102 and locating the magnetic material 106 between the RF charger coil 102 and metal material 112. The magnetic material 106 need not be in direct contact with the RF charger coil 102, and the magnetic material 106 need not be in direct contact with the metal material 112. The presence of the magnetic material 106 and the metal material 112 isolates the RF charger coil 102 from external effects caused by locating the RF charger coil 102 on a surface other than the surface used when the RF charger coil 102 was initially tuned. The magnetic material 104 further confines the magnetic field generated by the RF charger coil 102.

The magnetic material 104, 106 will confine the magnetic field produced by the RF charger coil 102 to within a limited defined area, and the metal material 112 will isolate the RF charger coil 102 from the surface on which a charger incorporating the charger portion 100 is located. Thus, a wireless charger can be tuned to work on any surface, reduce EMI emissions, and mitigate the energy coupling to an NFC device.

Figure 2:
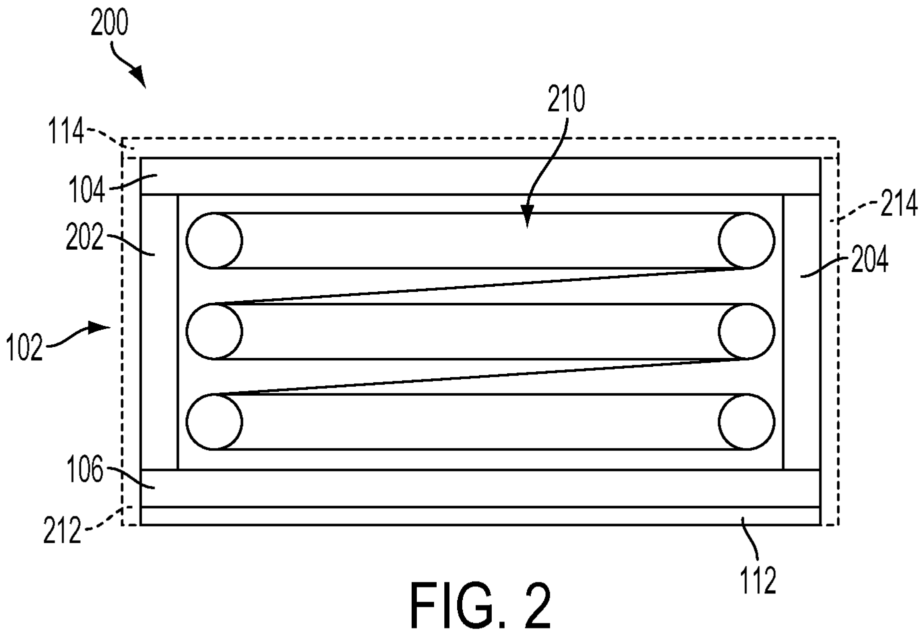
FIG. 2 is a schematic diagram showing a portion of a wireless charger having an RF charger coil.

FIG. 2 is a schematic diagram showing a portion 200 of a wireless charger having an RF charger coil 102. The portion 200 is an alternative embodiment of the portion 100 of FIG. 1. The portion 200 illustrates magnetic material 202 and 204 being located along the external periphery of the RF charger coil 102. The magnetic material 202 and 204 further confines the charging energy to an interior portion 210 of the RF charger coil 102. Optional metal material 212 and 214 can be located along the outer periphery of the magnetic material 202 and 204, respectively.

While the portions 104, 106, 202 and 204 of magnetic material are illustrated as discrete portions, the magnetic material can be formed of a single unitary structure incorporating the discrete portions 104, 106, 202 and 204. Similarly, while the portions 112, 114, 212 and 214 of metal material are illustrated as discrete portions, the metal material can be formed of a single unitary structure incorporating the discrete portions 112, 114, 212 and 214.

FIGS. 3A through 3D are schematic diagrams showing alternative embodiments of portions of a wireless charger having multiple RF charger coils. The diagrams of FIGS. 3A through 3D are schematic in nature in that they do not show a housing, enclosure or structure to contain and support the elements. Neither do FIGS. 3A through 3D show a power source or circuitry to generate the RF charging energy. Those having ordinary skill in the art will understand that the elements shown in FIGS. 3A through 3D are typically incorporated in a housing, enclosure or structure, including wiring, circuitry, and other elements and features. Further, while illustrated as cylindrically wound coils, the RF charger coils may be made of any conductive material, such as copper wire, and may take other shapes and form factors, such as, but not limited to, a multiple-turn conductive coil formed into a cylindrical shape or formed into a planar shape or may be implemented as a printed structure, such as a printed coil formed from a flexible film.

Figure 3A:
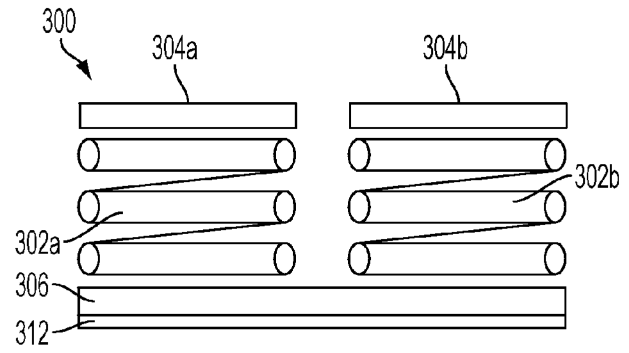
FIGS. 3A through 3D are schematic diagrams showing alternative embodiments of portions of a wireless charger having multiple RF charger coils.

FIG. 3A is a schematic diagram 300 showing an embodiment of a portion of a wireless charger having multiple RF charger coils. The charger portion 300 comprises RF charger coils 302*a* and 302*b*. Although shown for convenience of illustration as having two RF charger coils, the charger portion 300, and the charger portions shown in FIGS. 3B, 3C and 3D, may include more or fewer RF charger coils. A layer of magnetic material 306 underlays the RF charger coils 302*a* and 302*b*. A layer of metal material 312 underlays the RF charger coils 302*a* and 302*b* and also underlays the layer of magnetic material 306.

A layer of magnetic material overlays each RF charger coil 302*a* and 302*b*. In an embodiment, a layer of magnetic material 304*a* overlays the RF charger coil 302*a* and a layer of magnetic material 304*b* overlays the RF charger coil 302*b*. Although shown as two separate layers of magnetic material 304*a* and 304*b*, a single layer of magnetic material may also be used, depending on the structure of a wireless charger incorporating the described elements.

Figure 3B:
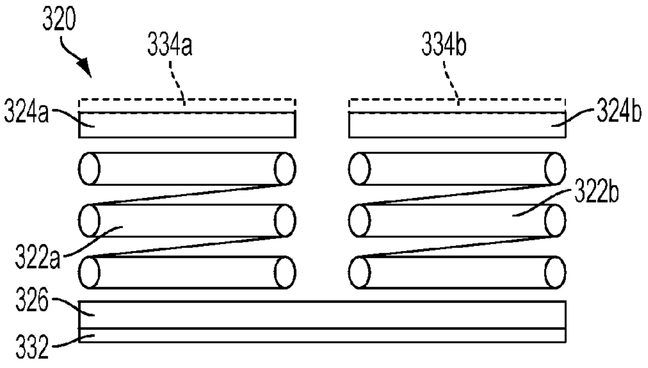

FIG. 3B is a schematic diagram 320 showing an alternative embodiment of a portion of a wireless charger having multiple RF charger coils. The charger portion 320 comprises RF charger coils 322*a* and 322*b*. A layer of magnetic material 326 underlays the RF charger coils 322*a* and 322*b*. A layer of metal material 332 underlays the RF charger coils 322*a* and 322*b* and also underlays the layer of magnetic material 326.

A layer of magnetic material overlays each RF charger coil 322*a* and 322*b*. In an embodiment, a layer of magnetic material 324*a* overlays the RF charger coil 322*a* and a layer of magnetic material 324*b* overlays the RF charger coil 322*b*. Although shown as two separate layers of magnetic material 324*a* and 324*b*, a single layer of magnetic material may also be used, depending on the structure of a wireless charger incorporating the described elements.

An optional layer of metal material overlays each layer of magnetic material 324*a* and 324*b*. In an embodiment, a layer of metal material 334*a* overlays the layer of magnetic material 324*a* and a layer of metal material 334*b* overlays the layer of magnetic material 324*b*. Although shown as two separate layers of metal material 334*a* and 334*b*, a single layer of metal material may also be used, depending on the structure of a wireless charger incorporating the described elements.

Figure 3C:
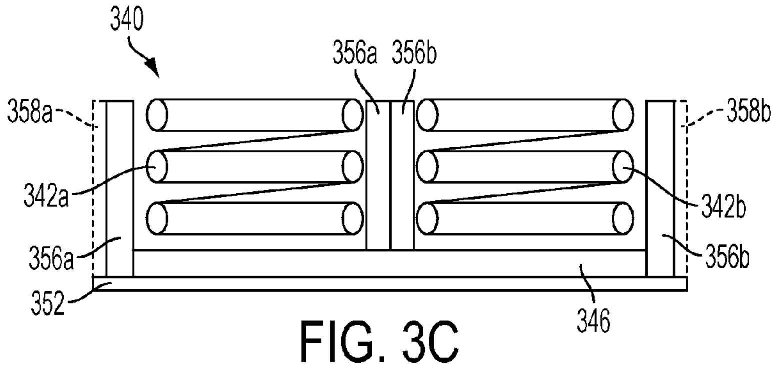

FIG. 3C is a schematic diagram 340 showing an alternative embodiment of a portion of a wireless charger having multiple RF charger coils. The charger portion 340 comprises RF charger coils 342*a* and 342*b*. A layer of magnetic material 346 underlays the RF charger coils 342*a* and 342*b*. A layer of metal material 352 underlays the RF charger coils 342*a* and 342*b* and also underlays the layer of magnetic material 346.

A layer of magnetic material surrounds each RF charger coil 342*a* and 342*b*. In an embodiment, a layer of magnetic material 356*a* surrounds the RF charger coil 342*a* and a layer of magnetic material 356*b* surrounds the RF charger coil 342*b*. Although shown as separate layers of magnetic material 356*a* and 356*b*, a single unitary layer of magnetic material may also be used, or a single unitary structure of magnetic material may be used to incorporate layers 346, 356*a* and 356*b*, depending on the structure of a wireless charger incorporating the described elements.

An optional layer of metal material surrounds each layer of magnetic material 356*a* and 356*b*. In an embodiment, a layer of metal material 358*a* surrounds the layer of magnetic material 356*a* and a layer of metal material 358*b* surrounds the layer of magnetic material 356*b*. Although shown as two separate layers of metal material 358*a* and 358*b*, a single layer of metal material may also be used, depending on the structure of a wireless charger incorporating the described elements. Further, the metal material that forms the layers 352, 358*a* and 358*b* can be incorporated to form a unitary structure of metal material, depending on the structure of a wireless charger incorporating the described elements.

Figure 3D:
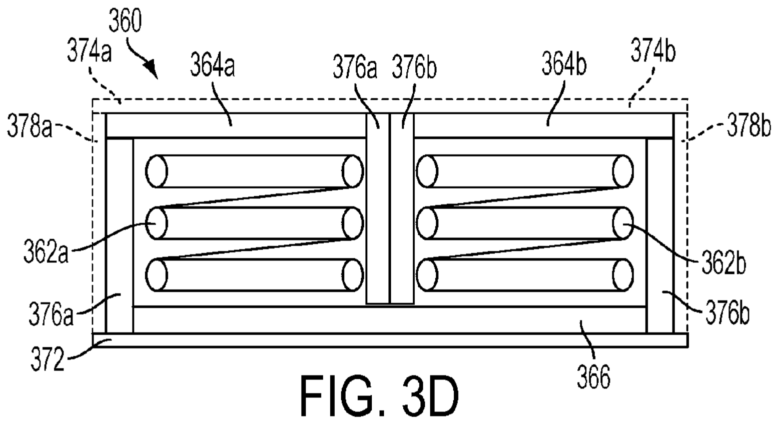

FIG. 3D is a schematic diagram 360 showing an alternative embodiment of a portion of a wireless charger having multiple RF charger coils. The charger portion 360 comprises RF charger coils 362*a* and 362*b*. A layer of magnetic material 366 underlays the RF charger coils 362*a* and 362*b*. A layer of metal material 372 underlays the RF charger coils 362*a* and 362*b* and also underlays the layer of magnetic material 366.

A layer of magnetic material surrounds each RF charger coil 362*a* and 362*b*. In an embodiment, a layer of magnetic material 376*a* surrounds the RF charger coil 362*a* and a layer of magnetic material 376*b* surrounds the RF charger coil 362*b*.

A layer of magnetic material overlays each RF charger coil 362*a* and 362*b*. In an embodiment, a layer of magnetic material 364*a* overlays the RF charger coil 362*a* and a layer of magnetic material 364*b* overlays the RF charger coil 362*b*. Although shown as separate layers of magnetic material 366, 364*a*, 364*b*, 376*a* and 376*b*, a single unitary layer of magnetic material may also be used, or a single unitary structure of magnetic material may be used to incorporate layers 364*a*, 364*b*, 376*a* and 376*b*, depending on the structure of a wireless charger incorporating the described elements.

An optional layer of metal material surrounds each layer of magnetic material 376*a* and 376*b*. In an embodiment, a layer of metal material 378*a* surrounds the layer of magnetic material 376*a* and a layer of metal material 378*b* surrounds the layer of magnetic material 376*b*.

An optional layer of metal material overlays each layer of magnetic material 364*a* and 364*b*. In an embodiment, a layer of metal material 374*a* overlays the layer of magnetic material 364*a* and a layer of metal material 374*b* overlays the layer of magnetic material 364*b*. Although shown as separate layers of metal material 374*a*, 374*b*, 378*a* and 378*b*, a single layer of metal material may also be used, depending on the structure of a wireless charger incorporating the described elements. Further, the metal material that forms the layers 372, 374*a*, 374*b*, 378*a* and 378*b* can be incorporated to form a unitary structure of metal material, depending on the structure of a wireless charger incorporating the described elements.

Figure 4A:
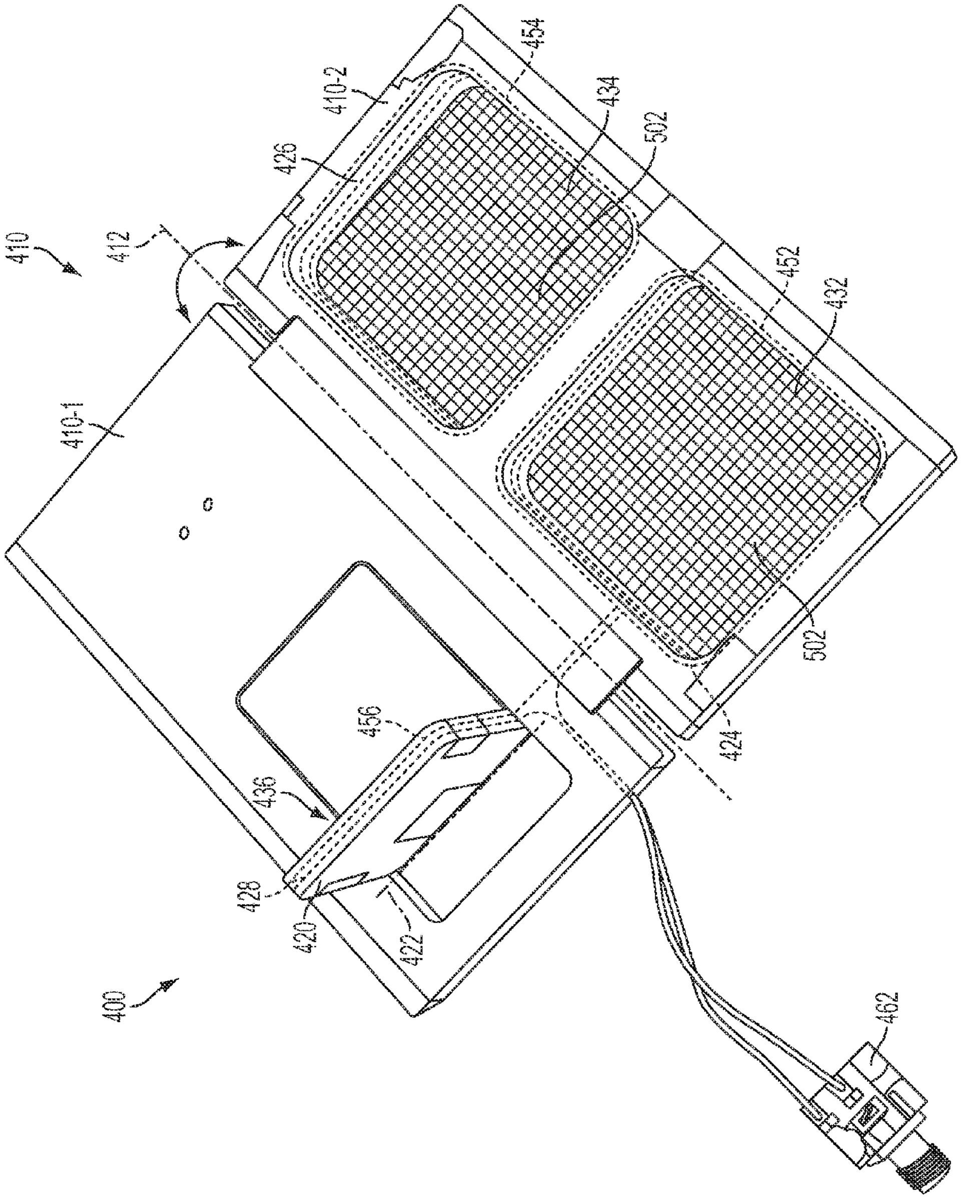
FIG. 4A is a pictorial diagram illustrating a first embodiment of a wireless charger.

FIG. 4A is a pictorial diagram illustrating a first embodiment of a wireless charger 400. The wireless charger 400 comprises a first charger portion 410 and a second charger portion 420. In an embodiment, the first charger portion 410 comprises a first element 410-1 and a second element 410-2, rotatably coupled together at a pivot axis 412. A hinge (not shown) operates on the pivot axis 412. In an embodiment, the first element 410-1 and the second element 410-2 can rotate about the pivot axis 412 so they can be folded together or opened as shown in FIG. 4A.

In an embodiment, the second element 410-2 of the first charger portion 410 may be adapted for charging ear-worn devices, and the second charger portion 420 may be adapted for charging wrist-worn devices. The second charger portion 420 is located adjacent to the first element 410-1 of the first charger portion 410 using, for instance, a hinge 422. The hinge 422 may allow the major axis of the second charger portion 420 to be rotated to a position that is substantially orthogonal to the major axis of the first charger portion 410, as shown in FIG. 4A, and also may allow the second charger portion 420 to be rotated downward to a position that is substantially parallel to the major axis of the first charger portion 410.

The element 410-2 of the first charger portion 410 comprises a charging area 432 and a charging area 434. An antenna 424 is located proximate to the charging area 432 and an antenna 426 is located proximate to the charging area 434. In an embodiment, the charging area 432 and the charging area 434 comprise a recess or depression. In the embodiment shown in FIG. 4A, the antenna 424 surrounds the charging area 432 and the antenna 426 surrounds the charging area 434, and in an embodiment, can be located within or embedded within the material that forms the second element 410-2. The antennas 424 and 426 are illustrated using dotted lines to reflect that they are typically embedded within the material used to form the element 410-2. However, the antennas 424 and 426 can be located proximate to the charging areas 432 and 434, respectively, but external to the housing of the element 410-2. In an embodiment, the magnetic material 502 is formed using a continuous sheet of material and is located on a surface that forms the floor of the charging area 432 and the charging area 434, respectively. The magnetic material 502 will be explained in greater detail below in FIGS. 4B, 5A and 5B. Additional magnetic material and optional metal material can be embedded with the element 410-2 and will be described below in FIG. 4B.

The second charger portion 420 comprises a charging area 436. An antenna 428 is located proximate to the charging area 436. In an embodiment, any of the antennas 424, 426 and 428 can be fabricated using conductive material, such as copper wire, to form a multiple-turn conductive coil into a cylindrical shape or into a planar shape or may be implemented as a printed structure, such as a printed coil formed on a flexible film. The antennas 424, 426 and 428 can be embodied by any of the coils described above in FIGS. 1, 2 and 3A through 3D. In an embodiment, a connector and circuit 462 supplies radio frequency (RF) charging energy to the antennas 424, 426 and 428, which can provide charging energy at a frequency of approximately 6.78 MHz. Although illustrated as being external to the wireless charger 400, the connector and circuit 462 can be located within the element 410-2 or the element 410-2. The device to be charged is placed in proximity to an appropriate antenna 424, 426 and 428, and charging may occur via RF energy coupling, as described in co-pending, commonly assigned U.S. Utility patent application Ser. No. 13/481,826, filed May 26, 2012 and entitled "APPARATUS FOR WIRELESS DEVICE CHARGING USING RADIO FREQUENCY (RF) ENERGY AND DEVICE TO BE WIRELESSLEY CHARGED", the entire disclosure of which is hereby incorporated into this document by reference.

In an embodiment, the antennas 424, 426 can be formed as cylindrical coils 452 and 454, respectively, and the antenna 428 can be formed as a planar coil 456, using a continuous length of conductive wire such that the antennas 424, 426 and 428 are all connected in series to provide the highest possible efficiency for charging devices. In an embodiment, the antennas 424, 426 and 428 can be coupled together using switching circuitry (not shown) to allow fewer than all of the antennas to generate RF charging energy. Further, it is desirable that the antennas 424 and 426 be located as close to each other as possible to reduce the overall size of the wireless charger 400. Further, the windings of the cylindrical coil 452 may be wound in a direction opposite that of the windings of the cylindrical coil 454 to reduce interference between the coils.

Figure 4B:
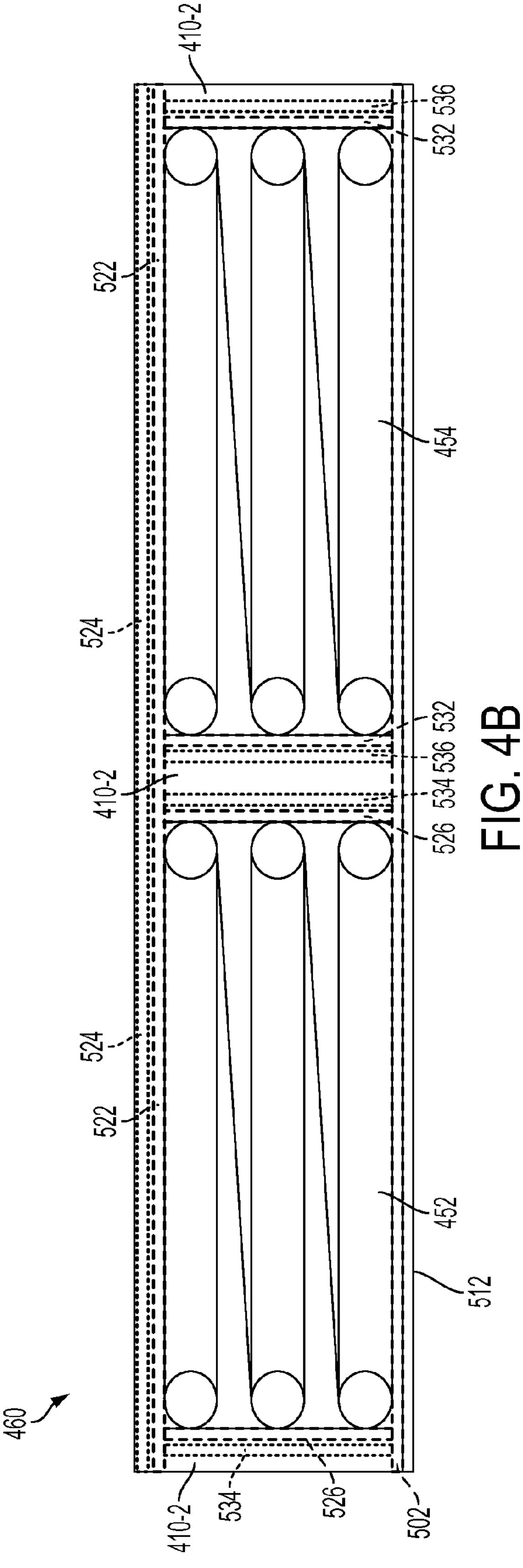
FIG. 4B is a cross-sectional diagram illustrating a portion of the wireless charger of FIG. 4A.

FIG. 4B is a cross-sectional diagram illustrating a portion of the wireless charger of FIG. 4A. The cross-sectional view 460 shows a cut-away view of the element 410-2 and the coils 452 and 454. In the embodiment shown in FIG. 4A, the coils 452 and 454 are embedded within the material that forms the element 410-2. Embedding the coils 452 and 454 in the material that forms the element 410-2 simplifies manufacturability and allows for a compact and robust structure. The magnetic material 502 may be a single sheet of magnetic material, approximately 0.375 mm thick, underlying the element 410-2 and the coils 452 and 454. A single sheet of metal material 512 may underlay the magnetic material 502 and may also be embedded within the element 410-2.

A layer of magnetic material 522 is located over the coils 452 and 454. An optional layer of metal material 524 is located over the magnetic material 522. In the embodiment shown in FIG. 4B, the magnetic material 522 and the optional metal material 524 is embedded within the material that forms the element 410-2.

An optional layer of magnetic material 526 surrounds the coil 452 and an optional layer of metal material 534 surrounds the magnetic material 526. An optional layer of magnetic material 532 surrounds the coil 454 and an optional layer of metal material 536 surrounds the magnetic material 532. In the embodiment shown in FIG. 4B, the optional magnetic material 526 and 532; and the optional metal material 534 and 536 is embedded within the material that forms the element 410-2.

Figure 5A:
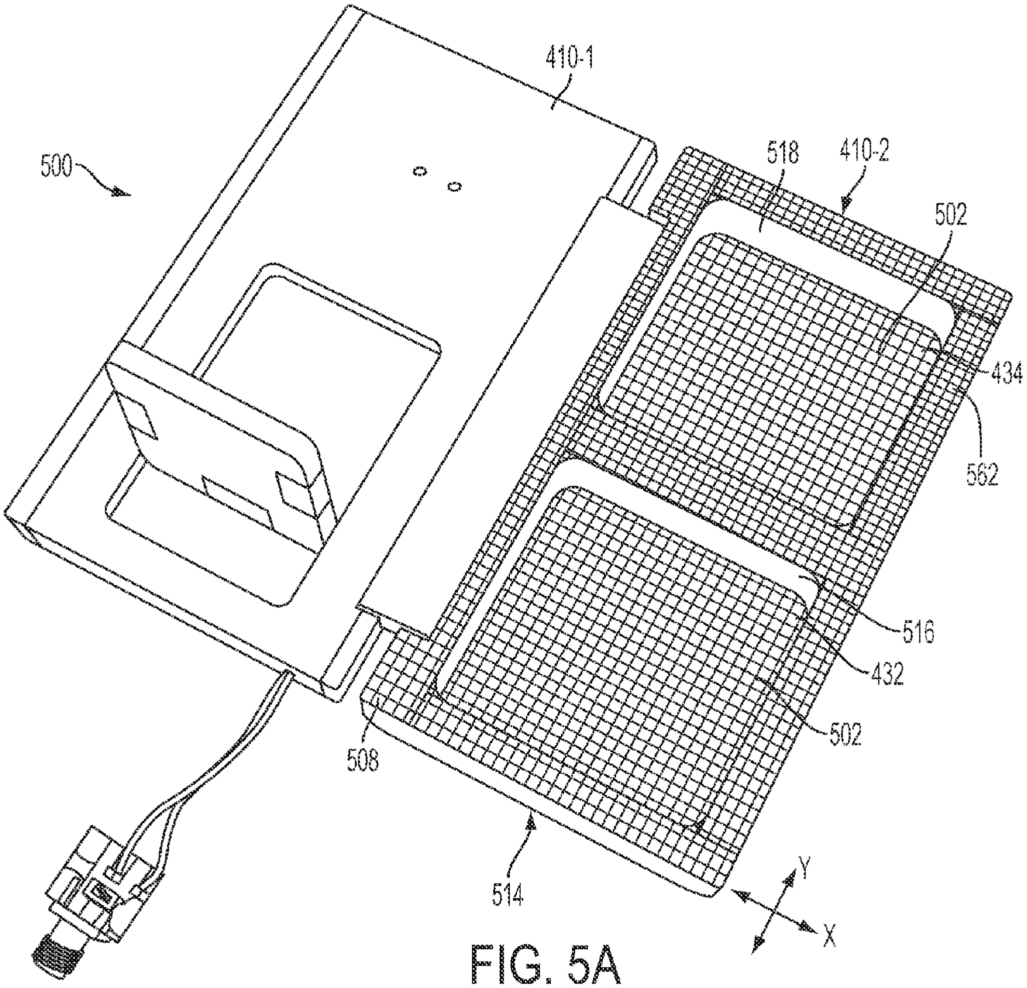
FIG. 5A is a pictorial diagram illustrating an alternative embodiment of the wireless charger of FIG. 4A.
Figure 6:
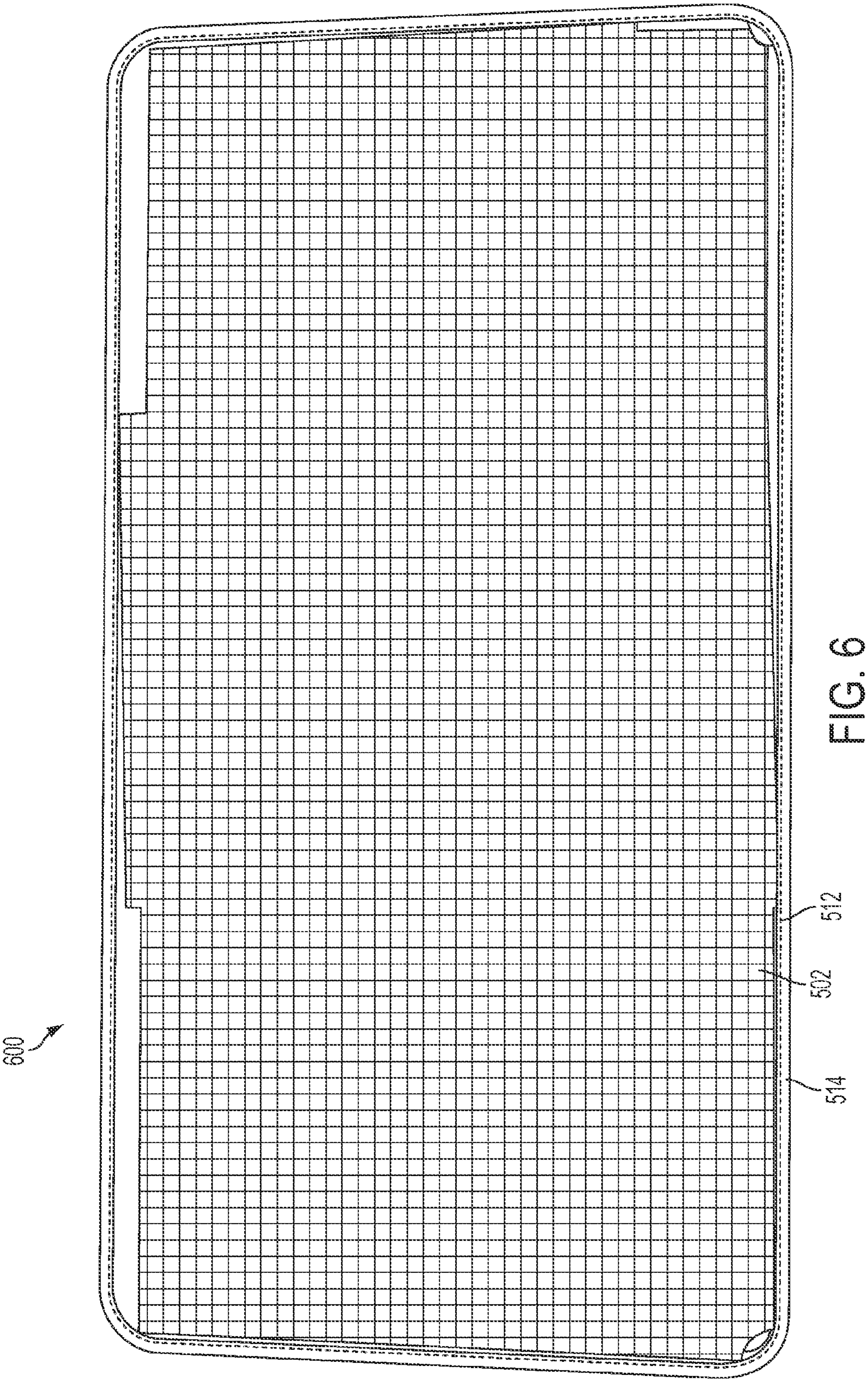
FIG. 6 is a pictorial diagram illustrating the underside of the wireless charger of FIGS. 4A and 5A.

FIG. 5A is a pictorial diagram 500 illustrating an alternative embodiment of the wireless charger of FIG. 4A. FIG. 6 is a pictorial diagram 600 illustrating the underside of the wireless charger of FIGS. 4A and 5A. The diagram 500 shows the element 410-2 of the wireless charger 500 having magnetic material 502 applied thereto, similar to that described above in FIG. 4A. The magnetic material 502, extends along the entire lower surface 514 (FIG. 6) of the second element 410-2. This arrangement is further illustrated in FIG. 6, which shows the sheet of magnetic material 502 applied over the surface 514. Although not shown in FIG. 6, a layer of metal material 512 may also extend along the x,y plane defined by the major axis of the planar surface of the element 410-2 and may extend along the entire lower surface 514 of the second element 410-2, covering the magnetic material 502.

Magnetic material 562 extends along a surface 508 of the element 410-2. The surface 508 is defined in an x,y plane that is substantially parallel to the surface 514.

FIG. 5A does not show the RF charger coil 452 (FIG. 4A) or the RF charger coil 454 (FIG. 4A), which are illustratively embedded within the element 410-2 around a periphery of the walls 516 of the charging area 432 and the walls 518 of the charging area 434.

A device to be charged (not shown) can be placed in the charging area 432 and/or the charging area 434. The magnetic material 502 and 562 confines the magnetic field generated by the RF charger coil 452 and/or the RF charger coil 454 and directs the magnetic field toward a center of the region of the charging area 432 defined by the walls 516 and toward a center of the region of the charging area 434 defined by the walls 518. The metal material 512 (FIGS. 4B and 5B) underlays the entire underside of the element 410-2, and underlays the RF charger coil 452 (FIGS. 4A and 5A) and RF charger coil 454 (FIGS. 4A and 5A). The metal material 512 allows a wireless charger that incorporates the element 410-2 to work well on any surface and the wireless charger could also be operated in closed (stowed) mode with the element 410-1 rotated so as to cover the element 410-2.

Figure 5B:
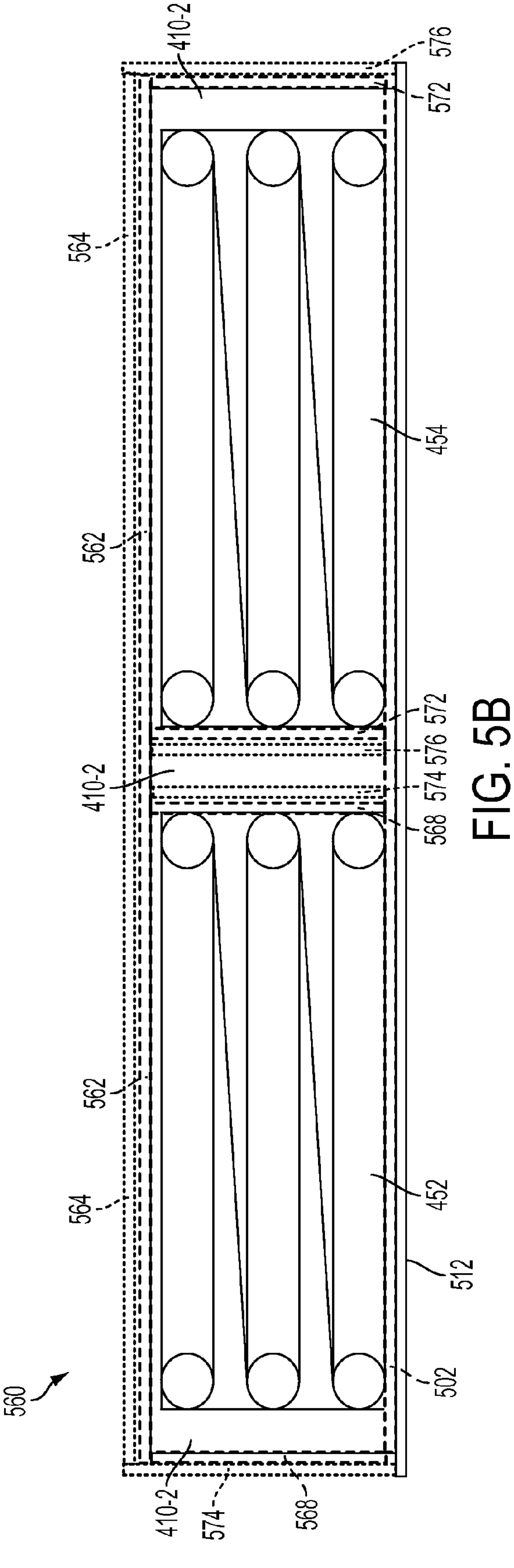
FIG. 5B is a cross-sectional diagram illustrating a portion of the wireless charger of FIG. 5A.

FIG. 5B is a cross-sectional diagram illustrating a portion of the wireless charger of FIG. 5A. The cross-sectional view 560 shows a cut-away view of the element 410-2 and the coils 452 and 454. In the embodiment shown in FIG. 5A, the coils 452 and 454 are embedded within the material that forms the element 410-2. Embedding the coils 452 and 454 in the material that forms the element 410-2 simplifies manufacturability and allows for a compact and robust structure. The magnetic material 502 may be a single sheet of magnetic material, approximately 0.375 mm thick, underlying the element 410-2 and the coils 452 and 454. A single sheet of metal material 512 may underlay the magnetic material 502 and may also be embedded within the element 410-2.

A layer of magnetic material 562 is located over the coils 452 and 454. An optional layer of metal material 564 is located over the magnetic material 562. In the embodiment shown in FIG. 5B, the magnetic material 562 and the optional metal material 564 is located over a surface 508 (FIG. 5A) of the element 410-2.

An optional layer of magnetic material 568 surrounds the coil 452 and an optional layer of metal material 574 surrounds the magnetic material 568. An optional layer of magnetic material 572 surrounds the coil 454 and an optional layer of metal material 576 surrounds the magnetic material 572. In the embodiment shown in FIG. 5B, the optional magnetic material 568 and 572; and the optional metal material 574 and 576 is located over the outside surface of the material that forms the element 410-2.

Figure 7:
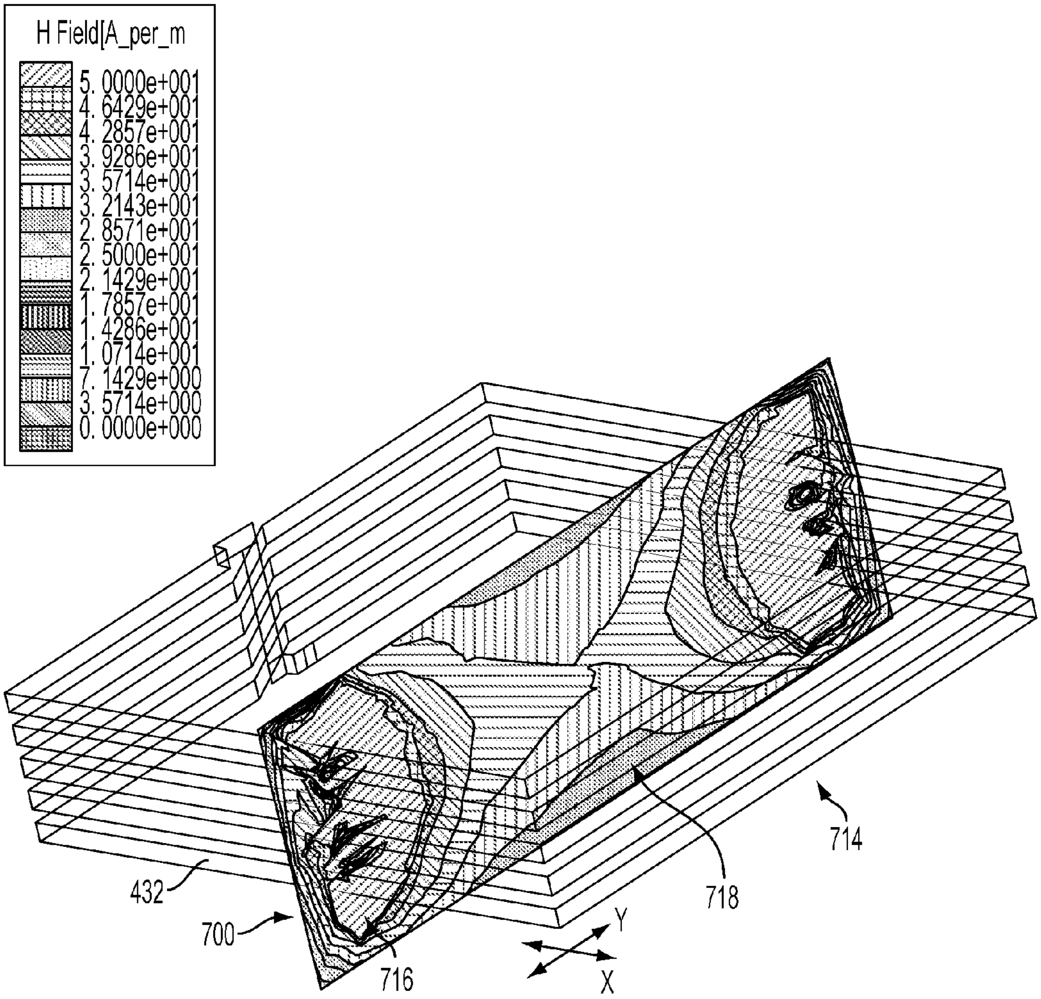
FIG. 7 is a diagram of an exemplary magnetic field generated by an RF charger coil without the presence of magnetic material or metal material.

FIG. 7 is a diagram of an example magnetic field 700 generated an exemplary RF charger coil 432 without the presence of magnetic material or metal material. As shown, the magnetic field 700 extends below an x,y plane 714 formed along the lower extent of the RF charger coil 432. The magnetic field extending below the plane 714 is generally highest in the region 716 and can be approximately 50 amperes/meter (A/m). The magnetic field extending below the plane 714 in the region 718 is generally lower than that in the region 716, but can still be approximately 28.6 amperes/meter (A/m).

Figure 8:
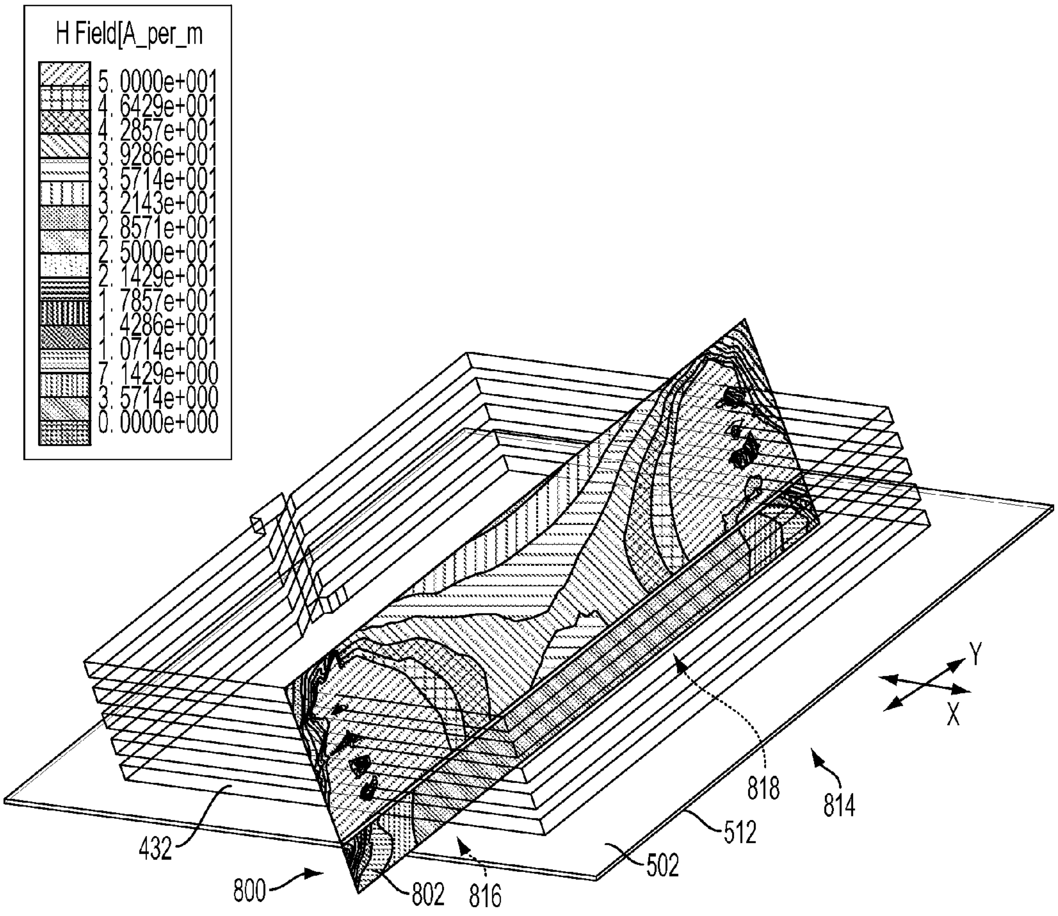
FIG. 8 is a diagram of an exemplary magnetic field generated by an RF charger coil having any of the magnetic material and metal material underlying the RF charger coil.

FIG. 8 is a diagram of an example magnetic field 800 generated by the exemplary RF charger coil 432 having any of magnetic material 502 (FIGS. 4B, 5B and 6) and metal material 512 (FIGS. 4B, 5B and 6) underlying the RF charger coil 432. The magnetic field 800 includes region 802, which illustrates the manner in which the presence of the magnetic material 502 and metal material 512 attenuates the magnetic field 800 beyond the plane 814 and minimizes the magnetic field 800 impacting the surface on which the RF charger coil 432 is located. In an embodiment, the magnetic field extending below the plane 814 is generally attenuated in the regions 816 and 818 to approximately 7.14 amperes/meter (A/m). The magnetic field in the region 816 is attenuated by approximately 85% with respect to the magnetic field in the region 716, and the magnetic field in the region 818 is attenuated by approximately 75% with respect to the magnetic field in the region 718. Other attenuation values and ranges are also possible.

Stated another way, the presence of the magnetic material 502 and the metal material 512 serves to redirect the magnetic field 800 so that most of the magnetic field 800 is confined above the plane 814 formed by the metal material 512 and substantially prevented from extending below the plane 814. As a result, only a small portion of the magnetic field 800 penetrates beyond the plane 814 formed by the metal material 512.

Depending upon the size and thickness of the magnetic material 502 and the metal material 512 relative to the RF charger coil 432, other amounts of attenuation may be provided. In particular, if the size and thickness of the magnetic material 502 and the metal material 512 is increased relative to the RF charger coil 432, larger attenuation may be achieved, and if the size and thickness of the magnetic material 502 and the metal material 512 is reduced relative to the RF charger coil 432, lower attenuation may be achieved.

Further, the permeability of the magnetic material 502 can also affect the attenuation. For example, the higher the permeability of the magnetic material 502, the greater the attenuation. Therefore, both the permeability of the magnetic material 502 and the size and thickness of the magnetic material 502 and the metal material 512 affect the attenuation. In an embodiment, a very high magnetic permeability of the magnetic material 502, with a relatively small size and thickness of magnetic material 502 and metal material 512 will have the very good attenuation. Similarly, a relatively lower value of permeability of the magnetic material 502, with a relatively thicker magnetic material 502 and metal material 512 could also achieve the same attenuation as higher permeability and smaller and thinner magnetic material 502 and metal material 512. The value of the permeability is typically determined by carefully choosing the magnetic material 502.

Thus, by varying the permeability of the magnetic material 502, the size of the magnetic material 502, the thickness of the magnetic material 502, the size of the metal material 512, the thickness of the metal material 512, or any combination of the permeability of the magnetic material 502, the size of the magnetic material 502, the thickness of the magnetic material 502, the size of the metal material 512, and/or the thickness of the metal material 512 relative to the RF charger coil 432, at least 10% attenuation, at least 20% attenuation, at least 30% attenuation, at least 40% attenuation, at least 50% attenuation, at least 60% attenuation, at least 70% attenuation, at least 80% attenuation, at least 90% attenuation, total or at least substantially total attenuation, or any combination thereof may be achieved.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. An apparatus for wireless charging using radio frequency (RF) energy, comprising:

a charger coil configured to produce RF charging energy as a magnetic field, the charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger coil and a second portion of magnetic material overlying the charger coil, wherein the magnetic material and the metal material attenuate the magnetic field beyond the plane between 10% and 90%.

2. The apparatus of claim 1, wherein the magnetic material and the metal material are located adjacent to the charger coil, the first portion of the magnetic material underlying the charger coil being located between the charger coil and the metal material.

3. The apparatus of claim 1, wherein the first portion of the magnetic material underlying the charger coil is adjacent to and in contact with the metal material underlying the charger coil.

4. The apparatus of claim 1, further comprising metal material located adjacent to the second portion of magnetic material overlying the charger coil.

5. The apparatus of claim 1, further comprising:

a recess configured to receive a charge-receiving device, the recess having a planar bottom surface and side walls extending substantially orthogonal to the planar bottom surface, the charger coil located along the side walls; and a third portion of magnetic material located about an outer periphery of the charger coil.

6. The apparatus of claim 5, further comprising metal material surrounding the third portion of magnetic material.

7. The apparatus of claim 1, further comprising a charger portion in which the charger coil is located, the first portion of the magnetic material embedded in the charger portion.

8. The apparatus of claim 1, wherein charging energy is transferred at a frequency of approximately 6.78 MHz.

9. The apparatus of claim 1, wherein the magnetic material and the metal material attenuate the magnetic field beyond the plane by at least 42 amperes/meter (A/m).

10. The apparatus of claim 1, wherein the magnetic material and the metal material attenuate the magnetic field beyond the plane by at least 21 amperes/meter (A/m).

11. The apparatus of claim 1, wherein the magnetic material and the metal material prevent the magnetic field from extending beyond the plane defined by the major surface of the magnetic material and the metal material.

12. The apparatus of claim 1, wherein the magnetic material and the metal material attenuate the magnetic field beyond the plane at least 75%.

13. The apparatus of claim 1, wherein the magnetic material and the metal material attenuate the magnetic field beyond the plane at least 85%.

14. The apparatus of claim 1, wherein the magnetic material and the metal material attenuate the magnetic field beyond the plane at least 20%.

15. The apparatus of claim 1, wherein the magnetic material and the metal material attenuate the magnetic field beyond the plane at least 30%.

16. The apparatus of claim 1, wherein the magnetic material and the metal material attenuate the magnetic field beyond the plane at least 40%.

17. The apparatus of claim 1, wherein the magnetic material and the metal material attenuate the magnetic field beyond the plane at least 50%.

18. The apparatus of claim 1, wherein the magnetic material and the metal material attenuate the magnetic field beyond the plane at least 60%.

19. The apparatus of claim 1, wherein the magnetic material and the metal material attenuate the magnetic field beyond the plane at least 70%.

20. The apparatus of claim 1, wherein the magnetic material and the metal material attenuate the magnetic field beyond the plane at least 80%.

21. An apparatus for wireless charging using radio frequency (RF) energy, comprising:

a charger coil configured to produce RF charging energy as a magnetic field, the charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger coil and a second portion of magnetic material overlying the charger coil, wherein the magnetic material and the metal material attenuate the magnetic field beyond the plane from approximately 50 amperes/meter (A/m) to approximately 7.14 A/m.

22. An apparatus for wireless charging using radio frequency (RF) energy, comprising:

a charger coil configured to produce RF charging energy as a magnetic field, the charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger coil and a second portion of magnetic material overlying the charger coil, wherein the magnetic material and the metal material attenuate the magnetic field beyond the plane between approximately 42 amperes/meter (A/m) and approximately 21 A/m.

23. An apparatus for wireless charging using radio frequency (RF) energy, comprising:

a charger coil configured to produce RF charging energy as a magnetic field, the charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger coil and a second portion of magnetic material overlying the charger coil, wherein the magnetic material and the metal material attenuate the magnetic field beyond the plane approximately 75%.

24. An apparatus for wireless charging using radio frequency (RF) energy, comprising:

a charger coil configured to produce RF charging energy as a magnetic field, the charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger coil and a second portion of magnetic material overlying the charger coil, wherein the magnetic material and the metal material attenuate the magnetic field beyond the plane approximately 85%.

25. An apparatus for wireless charging using radio frequency (RF) energy, comprising:

a charger coil configured to produce RF charging energy as a magnetic field, the charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger coil and a second portion of magnetic material overlying the charger coil, wherein the magnetic material and the metal material attenuate the magnetic field beyond the plane between approximately 75% and 85%.

26. An apparatus for wireless charging using radio frequency (RF) energy, comprising:

a charger portion having at least first and second charging areas, the first and second charging areas located in a common plane, the first and second charging areas each having at least one charger coil for wirelessly charging a charge-receiving device placed in proximity to any of the first and second charging areas, the at least one charger coil in each of the first and second charging areas comprising a respective winding configured to produce RF charging energy as a magnetic field, the at least one charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger portion and a second portion of magnetic material overlying the charger coil, wherein the magnetic material and the metal material attenuate the magnetic field beyond the plane between 10% and 90%.

27. The apparatus of claim 26, wherein the magnetic material and the metal material are located adjacent to the charger coil, the first portion of the magnetic material underlying the charger coil being located between the charger coil and the metal material.

28. The apparatus of claim 26, wherein the first portion of the magnetic material underlying the charger coil is adjacent to and in contact with the metal material underlying the charger coil.

29. The apparatus of claim 26, further comprising metal material located adjacent to the second portion of magnetic material overlying the charger coil.

30. The apparatus of claim 26, wherein:

the first and second charging areas each comprise a recess configured to receive a charge-receiving device, each recess having a planar bottom surface and side walls extending substantially orthogonal to the planar bottom surface, the charger coil located along the side walls; and a third portion of magnetic material located about an outer periphery of the charger coil.

31. The apparatus of claim 30, further comprising metal material surrounding the third portion of magnetic material.

32. The apparatus of claim 26, wherein charging energy is transferred at a frequency of approximately 6.78 MHz.

33. The apparatus of claim 6, wherein the magnetic material and the metal material attenuate the magnetic field beyond the plane by at least 42 amperes/meter (A/m).

34. The apparatus of claim 6, wherein the magnetic material and the metal material attenuate the magnetic field beyond the plane by at least 21 amperes/meter (A/m).

35. The apparatus of claim 6, wherein the magnetic material and the metal material prevent the magnetic field from extending beyond the plane defined by the major surface of the magnetic material and the metal material.

36. The apparatus of claim 6, wherein the magnetic material and the metal material attenuate the magnetic field beyond the plane at least 75%.

37. The apparatus of claim 6, wherein the magnetic material and the metal material attenuate the magnetic field beyond the plane at least 85%.

38. The apparatus of claim 6, wherein the magnetic material and the metal material attenuate the magnetic field beyond the plane at least 20%, at least 30%, at least 40%, at least 50%, at least 60%, at least 70%, and/or at least 80%.

39. An apparatus for wireless charging using radio frequency (RF) energy, comprising:

a charger portion having at least first and second charging areas, the first and second charging areas located in a common plane, the first and second charging areas each having at least one charger coil for wirelessly charging a charge-receiving device placed in proximity to any of the first and second charging areas, the at least one charger coil in each of the first and second charging areas comprising a respective winding configured to produce RF charging energy as a magnetic field, the at least one charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger portion and a second portion of magnetic material overlying the charger coil, wherein the magnetic material and the metal material attenuate the magnetic field beyond the plane from approximately 50 amperes/meter (A/m) to approximately 7.14 A/m.

40. An apparatus for wireless charging using radio frequency (RF) energy, comprising:

a charger portion having at least first and second charging areas, the first and second charging areas located in a common plane, the first and second charging areas each having at least one charger coil for wirelessly charging a charge-receiving device placed in proximity to any of the first and second charging areas, the at least one charger coil in each of the first and second charging areas comprising a respective winding configured to produce RF charging energy as a magnetic field, the at least one charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger portion and a second portion of magnetic material overlying the charger coil, wherein the magnetic material and the metal material attenuate the magnetic field beyond the plane between approximately 42 amperes/meter (A/m) and approximately 21 A/m.

41. An apparatus for wireless charging using radio frequency (RF) energy, comprising:

a charger portion having at least first and second charging areas, the first and second charging areas located in a common plane, the first and second charging areas each having at least one charger coil for wirelessly charging a charge-receiving device placed in proximity to any of the first and second charging areas, the at least one charger coil in each of the first and second charging areas comprising a respective winding configured to produce RF charging energy as a magnetic field, the at least one charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger portion and a second portion of magnetic material overlying the charger coil, wherein the magnetic material and the metal material attenuate the magnetic field beyond the plane approximately 75%.

42. An apparatus for wireless charging using radio frequency (RF) energy, comprising:

a charger portion having at least first and second charging areas, the first and second charging areas located in a common plane, the first and second charging areas each having at least one charger coil for wirelessly charging a charge-receiving device placed in proximity to any of the first and second charging areas, the at least one charger coil in each of the first and second charging areas comprising a respective winding configured to produce RF charging energy as a magnetic field, the at least one charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger portion and a second portion of magnetic material overlying the charger coil, wherein the magnetic material and the metal material attenuate the magnetic field beyond the plane approximately 85%.

43. An apparatus for wireless charging using radio frequency (RF) energy, comprising:

a charger portion having at least first and second charging areas, the first and second charging areas located in a common plane, the first and second charging areas each having at least one charger coil for wirelessly charging a charge-receiving device placed in proximity to any of the first and second charging areas, the at least one charger coil in each of the first and second charging areas comprising a respective winding configured to produce RF charging energy as a magnetic field, the at least one charger coil located proximate to a magnetic material and a metal material, the magnetic material and the metal material located to attenuate the magnetic field generated by the charger coil beyond a plane defined by a major surface of the magnetic material and the metal material, a first portion of the magnetic material underlying the charger portion and a second portion of magnetic material overlying the charger coil, wherein the magnetic material and the metal material attenuate the magnetic field beyond the plane between approximately 75% and 85%.

* * * * *